July 27, 1954
A. E. MOULTON
2,684,845
RUBBER BUSH OR TORSION SPRING
Filed Oct. 18, 1950
2 Sheets-Sheet 1
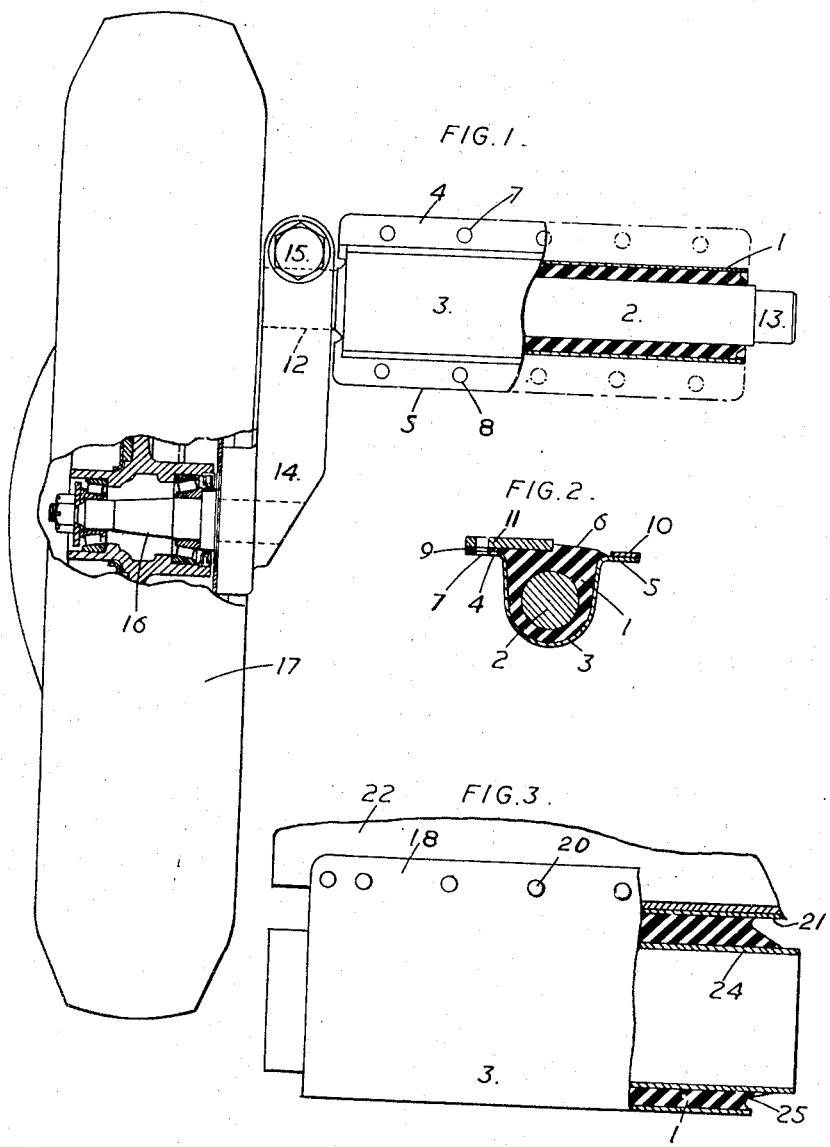
Inventor
ALEXANDER ERIC MOULTON
By *Ernest J. Meehlin*
Attorney July 27, 1954  A. E. MOULTON  2,684,845
RUBBER BUSH OR TORSION SPRING
Filed Oct. 18, 1950
2 Sheets—Sheet 2

Inventor
ALEXANDER ERIC MOULTON

By Ernest G. Mechlin
Attorney

Patented July 27, 1954

2,684,845

UNITED STATES PATENT OFFICE 2,684,845

RUBBER BUSH OR TORSION SPRING

Alexander Eric Moulton, Bradford-on-Avon, England, assignor to George Spencer Moulton & Company Limited, London, England, a body corporate of Great Britain Application October 18, 1950, Serial No. 190,739

3 Claims. (Cl. 267—57.1)

This invention relates to rubber torsional shear springs having inner and outer members between which is a rubber body adapted to function in torsional shear, for example, in a vehicle or like spring suspension.

In the simplified rubber torsional shear spring according to the present invention the outer member or shell is of deformable trough-like section and the rubber body is bonded to the periphery of the inner member and to the inner surface of the trough-like shell, but has an unbonded portion across the mouth of the trough.

The deformability of the shell and the free unbonded surface of the rubber allow the necessary deformation to take place to accommodate the shrinkage on cooling after moulding during the manufacture of the spring, also provides for the convenient application of the necessary consolidation pressure during moulding, and subsequently inward constraint of the rubber.

The inner member is preferably a solid or hollow shaft and the unbonded surface of the rubber is clamped by the outer shell component against a suitable surface on the supporting structure by means of bolts or screws passing through flanges provided for the purpose on the shell.

The free unbonded portion of the rubber across the mouth of the trough may be flat but it has been found advantageous in some cases for it to be protuberant or curviform instead of having a flat contour when viewed in section, and the bolting flanges of the outer shell component may be straight continuations of the U arms of the trough or may be bent at an appropriate angle to suit the supporting structure, such structure having a complementary shaped supporting surface for the free unbonded face of the rubber, either on the structure itself or preferably on an intermediate filling plate inserted during assembly or secured to the flanges of the outer shell during manufacture.

Precompression may be applied to the rubber body constituting the bush by the complementary supporting surface of the structure or an intermediate plate pressing on the protuberant portion of the rubber, the degree of which compression may be readily adjusted.

In all the aforementioned cases, the structure may form a component of the assembly which latter is only completed when the trough-like shell is bolted or otherwise secured to such structure and it will be appreciated that this construction obviates the need for separate clamps or other means for transmitting torque from the structure to the trough or outer shell and vice versa, the securing bolts or the like fulfilling this function.

The invention will be further described with reference to the accompanying drawings which illustrate several embodiments and wherein Figs. 1 and 2 show a simplified rubber torsional shear spring in a typical vehicle wheel suspension, Fig. 1 being a part longitudinal section and Fig. 2 a cross section showing the form of the rubber prior to and after assembly on some structural member such as a vehicle chassis having a plain surface to receive and mount the spring.

Figs. 3 and 4 are similar views of a modified arrangement where the bolting flanges form straight continuations of the trough-like outer shell.

Figure 5:
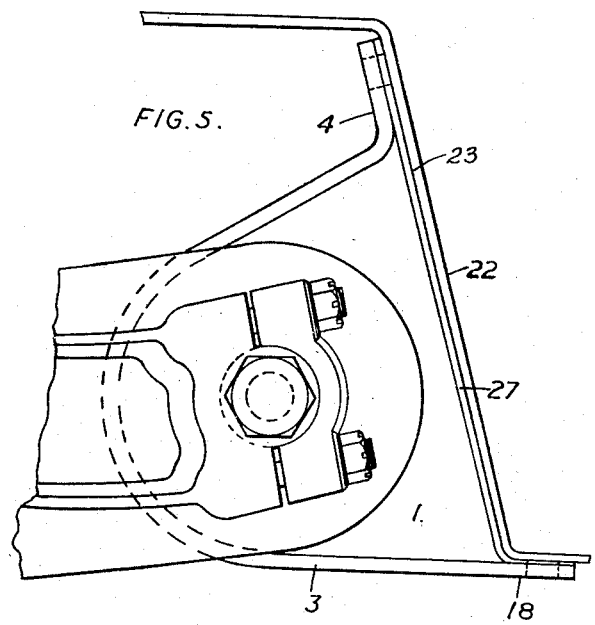
Fig. 5 is a detail elevational view showing a spring designed for fitting to the corner of a structure.

Referring now to the drawing, it being appreciated that fundamentally a torsional shear spring is a rubber and metal unit which has an inner metallic element or shaft and an outer metallic element or shell between which a rubber body is bonded, in Figs. 1 and 2 the rubber body is designated 1, the inner element or shaft is indicated at 2 and the outer shell at 3, the latter being formed with laterally projecting bolting flanges 4 and 5 which take the torque and by which the unit may be mounted on a suitable structure. The spring functions by rotating the inner element 2 relative to the outer element 3 through an angular range during which the rubber is strained in torsional shear.

In a vehicle wheel suspension, the spring is generally made to operate by attaching an arm to the inner element and fixing the wheel to the end of this arm, while the outer element is rigidly fixed to the vehicle structure as shown in Fig. 1.

In the execution of this fundamental idea of a torsional shear spring two difficulties present themselves, (1) the manufacture of the spring, and (2) the mounting of the spring on the structure.

Firstly, during manufacture, there is a wide disparity between the amount of shrinkage of rubber on cooling and metal on cooling after the hot moulding operation. In order to avoid the cleavage or weakening of the adhesion of the rubber from the metal during this part of the manufacture it is necessary for the metal to follow readily the adhering rubber as it contracts during cooling.

The trough or shell 3 must be flexible around its apex on the opposite side to the free rubber face. This allows the shrinkage of the rubber in relation to the metal to be accommodated by (a) the rippling of the free surface of the rubber, (b) the sinking of the central shaft towards the outer shell at the apex, and thereby narrowing the rubber thickness at this point somewhat, (c) the transverse flexing of the shell, allowing the transverse thickness of the rubber to be reduced somewhat.

From the point of view of mounting the torsional shear spring to a structure, it is necessary to provide a metallic holding means by which the outer shell can be attached; the attachment being such as to provide an accurate location for the spring as well as holding it rigid under the torque imposed on it by the rotation of the inner element in relation to the outer element.

By constituting the outer shell 3 as an open trough and leaving the rubber body 1 with a free unbonded surface 6 across the mouth of the trough these difficulties are to a large extent resolved in a particularly simple and economical manner.

The flanges 4 and 5, may, as will be appreciated, be set in a variety of attitudes for bolting, screwing or riveting to the supporting structure. With the embodiment shown in Figs. 1 and 2 the adjacent surface of such structure would be flat, bolts passing through holes 7 and 8 in the flanges 4 and 5 to securely mount the spring unit on the underside of a vehicle.

Figure 4:
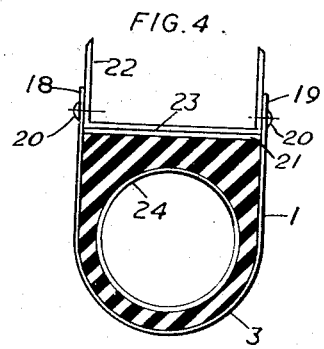

9 and 10 in Fig. 2 are packing strips which may be employed to adjust the precompression to which the rubber is subjected on final assembly with the supporting structure, and to this end also a filling plate of appropriate contour may be inserted between the structure indicated at 11 in this figure, and the free face 6 of the rubber as described hereafter in connection with Figures 3 and 4.

The inner shaft 2 may have shanks or projections 12 and 13 at each end of the spring to take symmetrically arranged arms for carrying the wheel or other element to be suspended, but in Fig. 1, a single torque transmitting wheel carrying arm 14 is held by a clamping bolt 15 on the shank 12, the other end of such arm 14 carrying a stub axle 16 upon which a pneumatic tired road wheel 17 rotates.

The radial distance of the free surface from the shaft is sufficient for the shear stress obtaining at the free surface indicated at 6 during operation to be readily resisted by the frictional forces which are generated on this free surface when the unit is assembled.

In Figs. 3 and 4 the flanges are represented at 18 and 19 as straight continuations of the walls of the trough or shell 3 and are secured to the supporting structure 22 by rivets or bolts 20. The supporting structure 22 is shaped at 23 to apply the requisite precompression to the free face 6 of the rubber through an intermediate fitting plate 21.

It will be noted that with such embodiments where the bolting flanges are parallel to each other or substantially so, a single row of bolts or rivets may secure both flanges to the structure.

In this embodiment also the inner element of the spring unit to which the rubber is bonded is a thin walled tube or shell 24 which projects at each end of the unit.

It is desirable for the end faces of the rubber body 1, i. e. those at each end of the shell to be free and unconstrained and suitably of the concave profile in section represented at 25.

In Fig. 5 the outer trough-like shell 3 is formed with one flange 4 for bolting to the face 23 of the supporting structure 22, while the other flange 18 is a straight continuation of the wall of the shell so that the unit can be bolted to the corner of the structure.

Reverting to Fig. 5, where a filling plate 27 is interposed between the body of rubber 1 and the structure 22, it will be appreciated that—during manufacture—the rubber may be bonded to such plate, providing there is left a free unbonded portion at each side where the rubber is connected to the wall of the trough or shell 3.

Finally, it will be understood that the wall of the trough-like shell may be reinforced against unwanted deformation by integral ribs or corrugations or by members rendered integral with the shell by welding.

What I claim is:

1. A rubber torsional shear spring comprising a rigid inner metallic element and an outer metallic shell between which an open-ended rubber body is bonded the bond being continuous around the periphery of the inner element, wherein the outer shell is of deformable trough-like section and the rubber body is bonded to the inner surface of the trough-like shell, but has an unbonded portion across the mouth of the trough and wherein the trough-like outer shell extends beyond the surface bonded to the rubber body to form flanges by which it is adapted to be mounted and secured on a supporting structure.

2. A rubber torsional shear spring according to the preceding claim 1 in combination with a supporting structure wherein such structure is secured to the flanges of the trough-like shell, thus making the unit rigid, and the supporting structure having a surface across the mouth of the trough applying a predetermined initial compression to the rubber body.

3. A rubber torsional shear spring according to the preceding claim 2 wherein intermediate filling plates are furnished between the surface of the supporting structure and the unbonded surface of the rubber.

References Cited in the file of this patent

UNITED STATES PATENTS

| Number | Name | Date |
| --- | --- | --- |
| 2,162,291 | Arlt | June 13, 1939 |
| 2,171,149 | Schroter | Aug. 29, 1939 |
| 2,241,827 | Rabe | May 13, 1941 |
| 2,251,416 | Parker | Aug. 5, 1941 |
| 2,251,453 | Jackson | Aug. 5, 1941 |
| 2,305,795 | Schieferstein | Dec. 22, 1942 |